United States Patent [19]
Kulberg et al.

[11] Patent Number: 5,844,985
[45] Date of Patent: Dec. 1, 1998

[54] VERTICALLY CORRECTING ANTENNA FOR PORTABLE TELEPHONE HANDSETS

[75] Inventors: Eric C. Kulberg; William R. Panton, both of San Diego; James H. Thompson; Stephen B. Tidwell, both of Carlsbad; Robert P. Gilmore, San Diego, all of Calif.

[73] Assignee: Qualcomm Incorporated, San Diego, Calif.

[21] Appl. No.: 532,920

[22] Filed: Sep. 22, 1995

[51] Int. Cl.⁶ ........................................... H04M 1/00
[52] U.S. Cl. ............................................. 379/433; 379/434
[58] Field of Search ...................... 379/433, 434, 379/428, 429; 455/89, 90, 128; 343/702, 793, 901, 792

[56] References Cited

U.S. PATENT DOCUMENTS

| | | | |
|---|---|---|---|
| 2,821,709 | 1/1958 | Fucci | 343/793 |
| 3,742,358 | 6/1973 | Cesaro | 325/3 |
| 4,001,830 | 1/1977 | Ishimura et al. | 343/702 |
| 5,045,971 | 9/1991 | Ono et al. | 361/386 |
| 5,120,135 | 6/1992 | Ullman | 366/273 |
| 5,170,494 | 12/1992 | Levanto | 455/90 |
| 5,228,339 | 7/1993 | Maresca, Jr. et al. | 73/290 |
| 5,410,141 | 4/1995 | Koenck et al. | 455/90 |
| 5,440,315 | 8/1995 | Wright et al. | 343/702 |
| 5,504,813 | 4/1996 | Takasaki | 379/434 |
| 5,506,593 | 4/1996 | Peng | 343/888 |
| 5,513,383 | 4/1996 | Tsao | 455/90 |
| 5,523,766 | 6/1996 | Erceg | 343/702 |
| 5,535,435 | 7/1996 | Balzano et al. | 455/89 |

FOREIGN PATENT DOCUMENTS

| | | | |
|---|---|---|---|
| 0611199 | 8/1994 | European Pat. Off. | H04B 1/38 |
| 0652646 | 5/1995 | European Pat. Off. | H04B 1/38 |
| 0694985 | 1/1996 | European Pat. Off. | H01Q 1/24 |
| 55-14180 | 11/1980 | Japan | H01Q 1/34 |
| 62-07130 | 4/1987 | Japan | H01Q 1/18 |

*Primary Examiner*—Jack K. Chiang
*Attorney, Agent, or Firm*—Russell B. Miller; Gregory D. Ogrod

[57] ABSTRACT

A portable phone unit for use in satellite communication systems has a vertically correcting antenna module pivotally secured to the handset for free rotation about a pivot axis. The module contains a mechanism, such as a gravitational counterweight for urging the module to pivot into a predetermined vertical orientation regardless of the handset orientation. An antenna projects from the module in a direction which is vertically upright when the module is in its predetermined vertical orientation. A mast mounted antenna module can also be used to take advantage of dissimilar antenna segment weights for multiple frequency antennas. As the handset is moved into an angular orientation, the module pivots under the weight of the counterweight, or a portion of the antenna itself, until the antenna is oriented vertically.

13 Claims, 4 Drawing Sheets

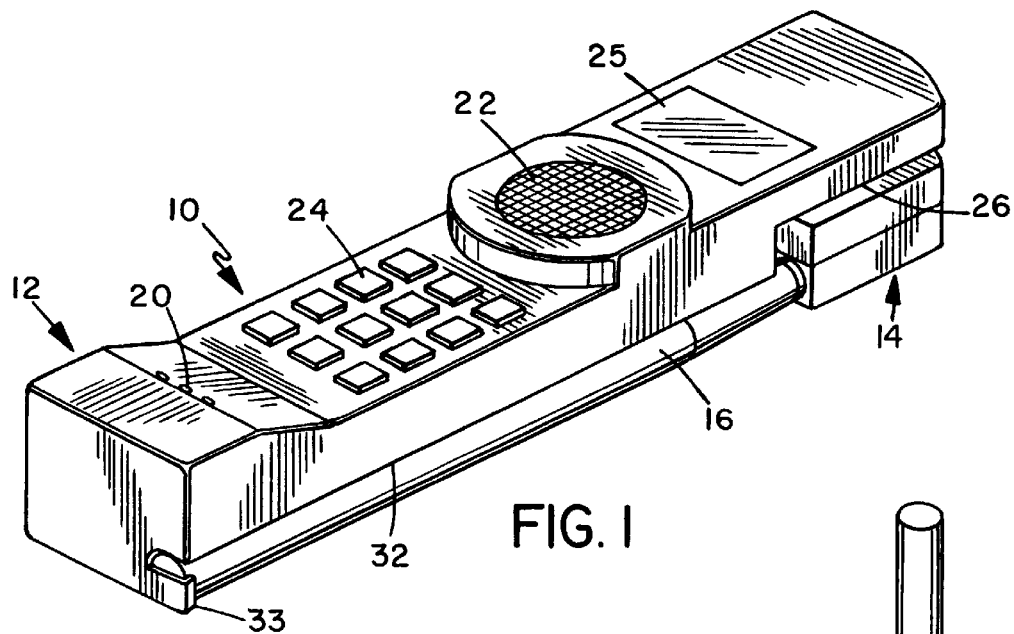
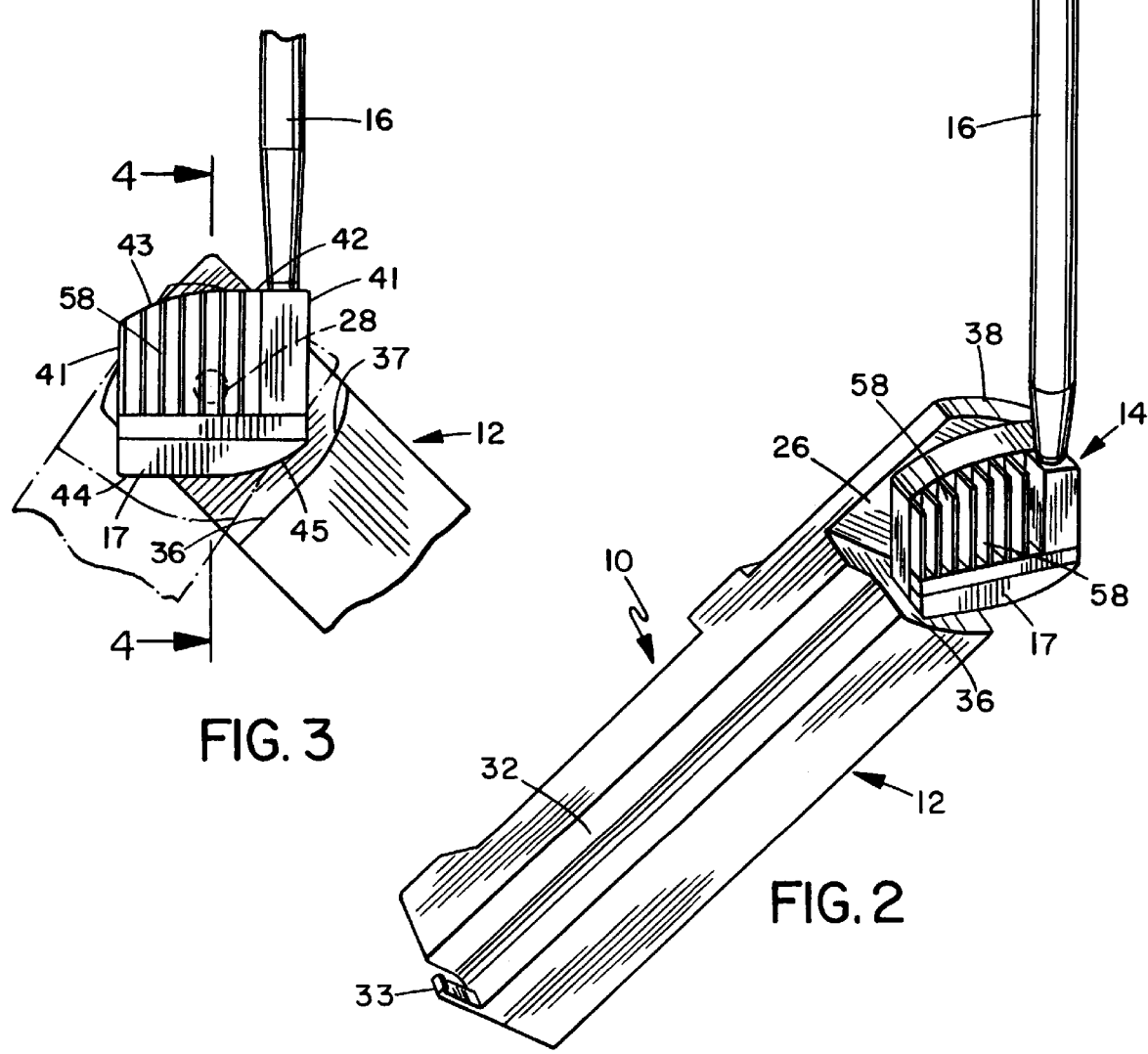

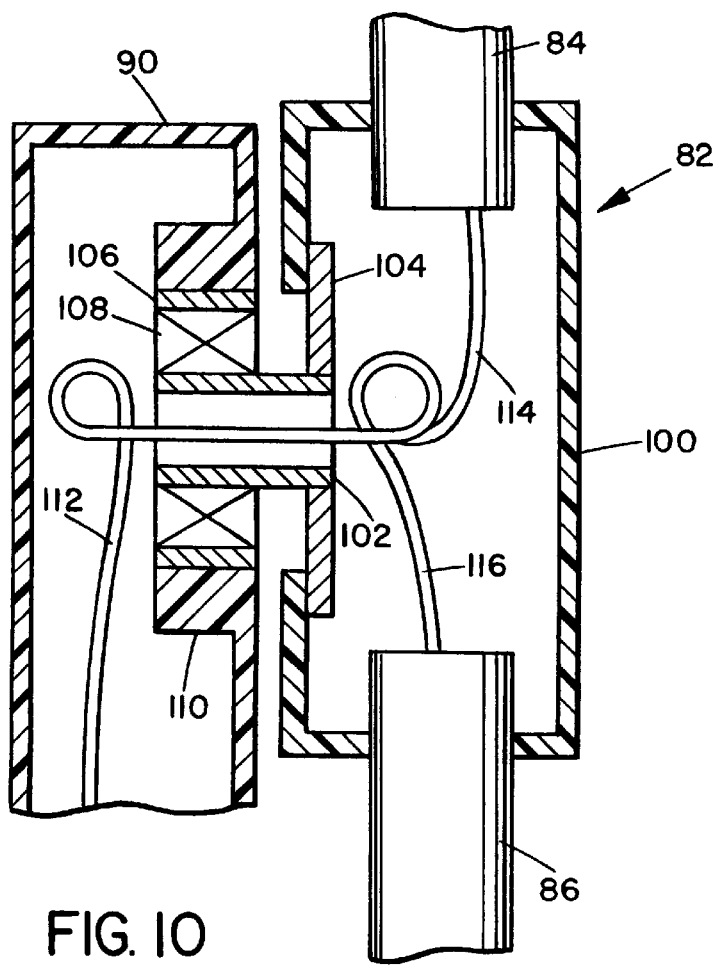
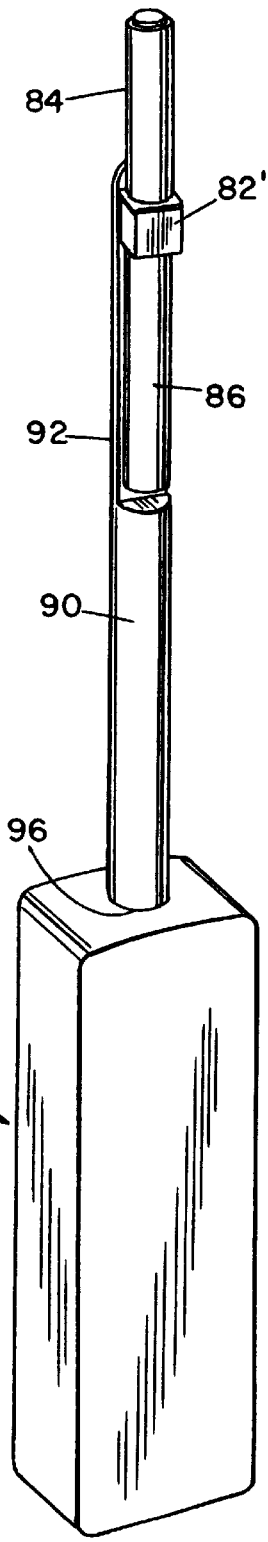
FIG. 10
FIG. 9

VERTICALLY CORRECTING ANTENNA FOR PORTABLE TELEPHONE HANDSETS

BACKGROUND OF THE INVENTION

I. Field of the Invention

The present invention relates generally to satellite communications and is particularly concerned with portable or handheld telephone units which are used for wireless communications with a remote site using communications satellites for transmitting and receiving radio frequency signals.

II. Description of the Related Art

In a cellular telephone system, communication occurs using fixed base stations, also referred to as cell sites, each covering a specific geographical area. In satellite communications, signals are transmitted to and from orbiting satellites. Large scale communication systems typically provide communication between fixed and mobile user stations or subscriber units using satellite or earth based repeater apparatus, or both. Such systems are described, for example, in U. S. Pat. No. 4,901,307, which issued Feb. 13, 1990 under the title "Spread Spectrum Multiple Access Communication System Using Satellite Or Terrestrial Repeaters", and U. S. patent application Ser. No. 08/368, 570, filed under the title "Method And Apparatus For Using Full Spectrum Transmitted Power In A Spread Spectrum Communication System For Tracking Individual Recipient Phase Time And Energy," which are both assigned to the assignee of the present invention, and incorporated herein by reference.

A subscriber unit or handset in such systems requires a specialized antenna for communication with satellites. Typically, the handset has a mouthpiece or microphone, an earphone or speaker, internally mounted components for receiving, processing and transmitting radio frequency signals, and an external antenna. The internal circuitry is suitably linked to the microphone, speaker and external antenna in a manner well known in the field. Orientation of the antenna can be quite important for proper signal communication with a satellite.

Antennas for use in satellite communication systems have radiation patterns that should be directed substantially upward from a local horizontal plane or horizon to efficiently couple energy to or from satellites traveling in overhead orbits. If a handset user holds the handset in an orientation in which the antenna is not vertical, or should alter the handset orientation during use, the radiation pattern (local horizon) is also positioned at an angle. In this position, communication may be lost or severely degraded as the radiation pattern no longer covers some satellite positions, or aligns a lower energy portion with others, and energy transfer decreases. Depending on the angle of the handset, even communications with satellites at fairly high elevations could suffer.

To compensate for this effect antennas can be designed with radiation patterns that extend below the local antenna horizon. That is, the radiation pattern extends below a horizon for the antenna so that some rotation of the handset off vertical still places satellites within the desired portion of the radiation pattern. Unfortunately, this design is less efficient in transferring signal energy even when aligned vertically and positioned optimally with respect to satellite positions. In addition, disruption of service can still result when the handset is rotated sufficiently, unless the radiation pattern extends an excessive amount below the horizon.

A new antenna direction mechanism is desired that compensates for handset motion during use without undue complexity.

SUMMARY OF THE INVENTION

It is an object of the present invention to provide a new and improved portable wireless telephone handset with an external, vertically correcting antenna.

According to the present invention, a portable telephone unit is provided, which comprises a telephone handset having a microphone and speaker or earphone, and an antenna module pivotally secured to the handset for rotation relative to the handset about a pivot axis. The pivot axis is oriented in a direction which will be at or close to horizontal when the handset is used normally. An antenna projects in a first, pointing direction from a first location on the antenna module, and a mechanism is provided for causing the antenna module to rotate so as to direct the opposite side of the module from the antenna to a lowermost position as the telephone handset is rotated. Therefore, the antenna is automatically maintained in a vertical position during telephone use.

In a preferred embodiment, a counterweight is provided at an opposite location on the module from the antenna, for weighting the module in the opposite direction to the antenna pointing direction. With this arrangement, when a user places the handset adjacent their head at an appropriate angle, the counterweight rotates the module into a predetermined orientation in which the counterweight is lowermost, and the antenna is oriented vertically. The counterweight acts to continually adjust the antenna position as the handset is moved, with the module rotating freely about the pivot axis as the counterweight is urged by gravity into a lowermost position.

In another embodiment, multiple antenna elements are mounted along a common central axis to form a single antenna structure. Each antenna element has a different length to accommodate different frequencies, or wavelengths, of operation. Such antenna structures are secured to the freely rotating antenna module that is mounted on the handset housing, or in the alternative at the end of an extendible support mast. A relative difference exists in antenna element mass due to the difference in antenna radiator length and size. By mounting the antenna structure with the axis of rotation for the module near the junction of the two elements, this weight differential can be used to maintain vertical orientation.

The handset preferably comprises a generally rectangular housing having a front wall in which the mouthpiece and speaker are located, a rear wall, an upper wall, a lower wall, and spaced side walls. The front wall may also have a keypad and a visual display unit. The antenna module is preferably pivotally mounted on the rear wall of the housing, and a recess may be provided in the rear wall adjacent the upper end of the housing for mounting the antenna module. The antenna module is preferably shaped to fit into the recess with its outer surfaces substantially flush with the adjacent surfaces of the handset housing when the antenna is rotated into an inoperative, stored position adjacent the handset. A recess may also be provided for receiving the antenna in the stored position. During use of the handset, the antenna module will rotate freely about the pivot axis as the handset is moved into non-vertical orientations.

Portable phone handsets contain various internal components and circuitry for receiving and transmitting wireless signals, including a power supply, power amplifier, control unit or microprocessor, radio frequency transmitter and receiver, low noise amplifier, duplexer, and the like. Some of these components have a tendency to radiate a substantial amount of heat and even become hot during use, potentially causing the handset housing or casing itself to become warm. Preferably, the antenna module of this invention includes an internal cavity for mounting radio frequency components of the portable telephone unit, and suitable wiring or cables extending through the pivot connection to link the radio frequency components and antenna to other circuitry within the handset itself. This has the advantage that the radio frequency components are mounted in close proximity to the antenna itself, allowing efficient energy transfer and antenna performance. Additionally, the antenna module may be designed to have greater heat transmission characteristics than the handset, and may have heat transferring fins, for example, so that greater heat dissipation is possible for components mounted in the antenna module, and the risk of overheating is reduced.

The pivot axis extends transverse to the front wall of the housing, in an orientation which will normally be at or close to horizontal when the phone unit is in use, regardless of the orientation or angle of the handset itself. The antenna is constantly counterweighted by the built-in counterweight into a vertical orientation for acceptable antenna reception and transmission.

The portable phone unit may be designed for satellite communication only, or may be usable in satellite or cellular phone modes, and may have an additional, built-in cellular antenna. The pivotal mounting of the antenna with a counterweight element ensures that the antenna will seek a vertical orientation regardless of the actual phone orientation, reducing the risk of signal loss as a result of improper antenna orientation. The phone user does not have to orient the antenna, but the antenna module will rotate freely into the proper orientation under the influence of the counterweight which constantly seeks gravity. Thus, the counterweight will maintain the antenna in a more optimal, vertical orientation.

At the same time, due to the assurance of a reasonably vertical orientation for an antenna mounted according to the invention, the radiation pattern of the antenna can be optimized to have a more vertical pattern with more efficient signal energy transfer or coupling, improving communications.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 is a perspective view of a portable telephone according to a preferred embodiment of the invention, with a pivoting antenna in a closed position;

FIG. 2 is a perspective view of the telephone of FIG. 1 in a position of use, with the antenna in a self-sustaining vertical position;

FIG. 3 is a rear view of the telephone of FIG. 1 showing different positions with the antenna remaining vertical;

FIG. 9 is a perspective view of the rear of the telephone of FIG. 7 where the antenna is further mounted on a support mast extending from an interior passage according to still another embodiment of the invention; and FIG. 10 is an enlarged sectional view of an antenna support module useful for implementing the telephone handsets of FIGS. 7, 8, and 9.

DESCRIPTION OF THE PREFERRED EMBODIMENT

Figure 4:
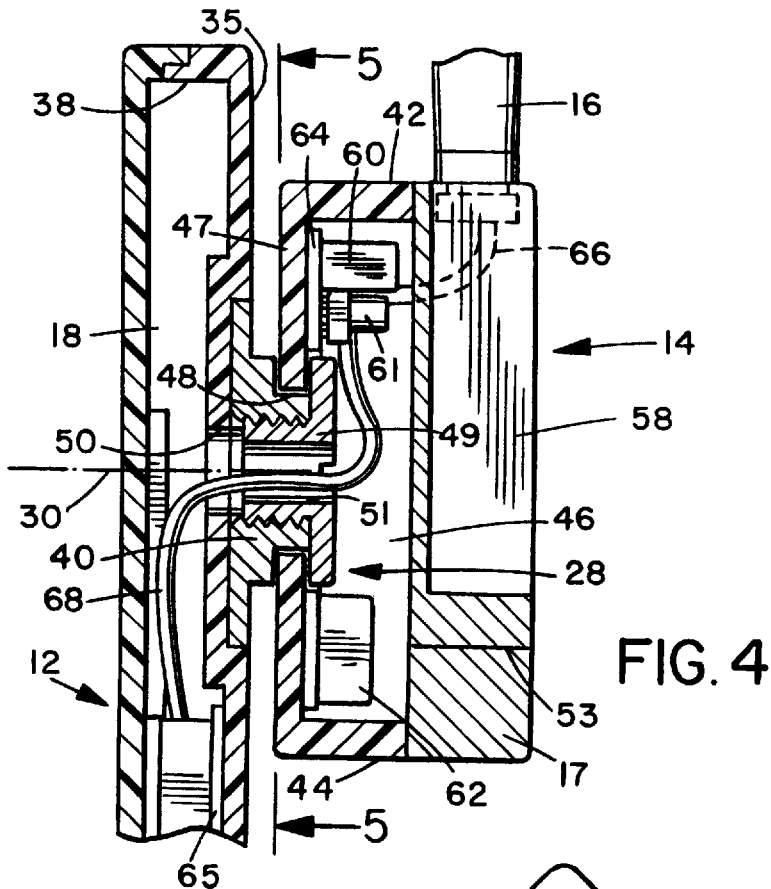
FIG. 4 is an enlarged sectional view taken on line 4—4 of FIG. 3.

The present invention is a technique for automatically orienting an antenna on a portable communications device vertically during use to improve the coupling of signal energy with satellite repeaters and sources. The invention also allows improved radiation pattern tailoring for the antenna, which further improves communications. The invention achieves these functions by securing an antenna or antenna structure on an antenna module which is rotatably mounted on the communication device. A mechanism is then provided that automatically directs a portion of the module opposite the antenna, or an uppermost part of the antenna structure, to a downward position during use.

FIGS. 1–3 of the drawings illustrate a portable telephone 10 according to a preferred embodiment of the invention, comprising a handset 12 and an antenna unit or module 14 pivotally mounted on a rear wall of the handset, with an antenna 16 projecting from module 14. The antenna may be any type of antenna which is conventionally used in satellite communication systems, such as, but not limited to, a quadrifilar helix antenna. A relatively heavy, solid counterweight 17 is embedded in module 14 on the opposite side to antenna 16. Counterweight 17 is a block of dense material such as, but not limited to, brass. The remainder of the module 14 is of relatively lightweight material such as plastic, and the counterweight is significantly heavier than antenna 16, so that it acts to urge the module 14 to continually seek a predetermined, vertical orientation in which the counterweight is lowermost and the antenna points vertically upwards.

The handset 12 comprises a generally rectangular housing having an internal cavity 18 in which various conventional portable telephone components are mounted. A conventional microphone 20 and speaker 22 are provided in the front wall of the housing, as best illustrated in FIG. 1, along with a conventional keypad 24 and visual display unit 25.

The antenna module 14 is pivotally mounted in a recess 26 in the rear wall of the housing via a pivot joint 28, as best illustrated in FIGS. 2–4. Pivot joint 28 defines a pivot axis 30 which extends transverse to the front wall of the housing and parallel to the central axis of the speaker 22, which will be held against the user's ear during use. The shape and dimensions of recess 26 substantially match those of the antenna module 14, so that in a closed, inoperative, position as shown in FIG. 1, the module 14 will be substantially flush with the adjacent surfaces of the handset. The housing has an elongate recess 32 extending along one side wall for receiving the antenna 16 when not in use, as illustrated in FIG. 1. A suitable releasable snap or latching device is provided for releasably holding the antenna in recess 32. In the illustrated embodiment, a snap lock finger or latch 33 is provided at the lower end of recess 32. However, in alternative embodiments, a ball and socket type of detent mechanism may be provided between module 14 and recess 26.

Figure 5:
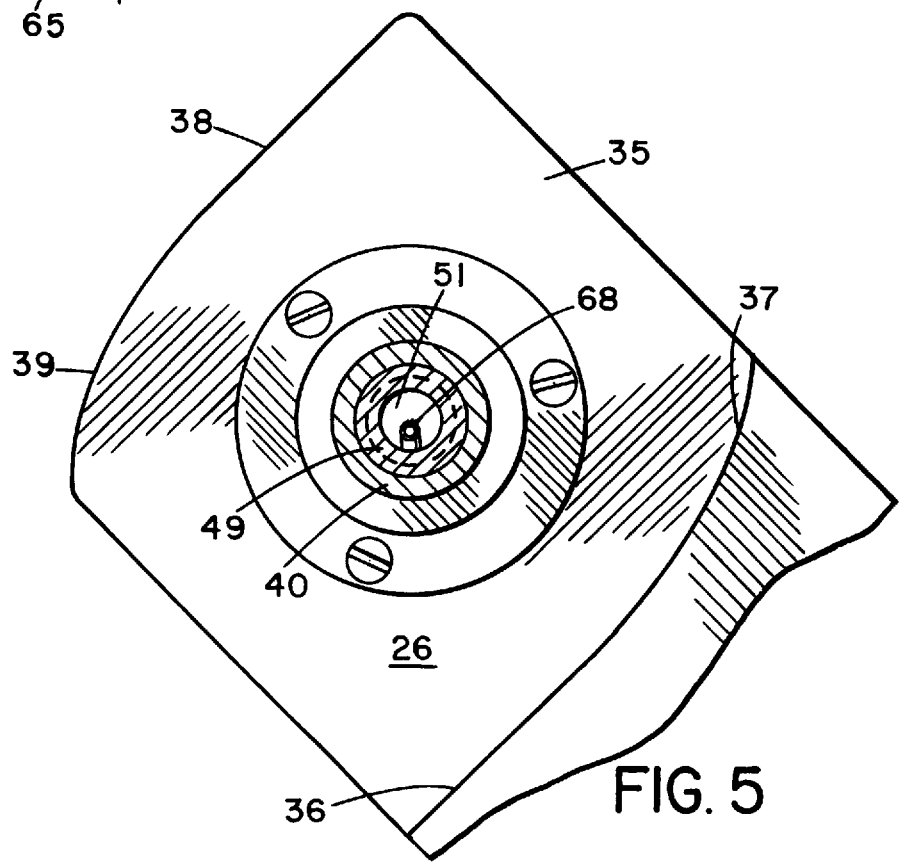
FIG. 5 is a sectional view taken on line 5—5 of FIG. 4.
Figure 6:
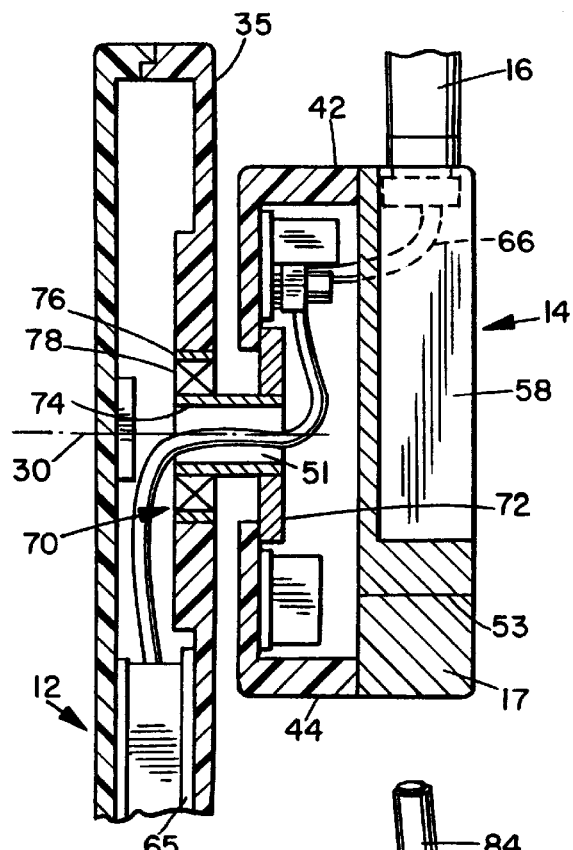
FIG. 6 is an alternative embodiment for the sectional view of FIG. 5.

As mentioned above, the antenna module 14 and recess 26 are of substantially matching shape and dimensions. Any shape may be selected which permits the antenna module 14 to pivot freely about pivot axis 30 when the antenna is not retained in recess 32. However, the shape of antenna module 14 is preferably selected such that it matches the shape of adjacent surfaces of the handset module. Thus, in the illustrated embodiment, the recess 26 is generally square in shape with a flat inner wall 35 and a lower wall 36 having an upwardly curved portion 37 adjacent one side wall. The upper wall 38 of the handset is of similar shape to the lower wall 36 of the recess, with a similarly downwardly curved portion 39 adjacent the opposite side wall to curved portion 37, as best illustrated in FIG. 5. The pivot joint 28 includes a pivot member or pin 40, or a bearing assembly 50, which is secured in the center of the inner wall 35 of the recess, as illustrated in FIGS. 5 and 6.

The antenna module 14 is also generally square in shape with spaced, parallel side walls 41, an upper wall 42 having a curve 43 at one side matching curves 37, 39 and a lower wall 44 having a curve 45 at the opposite side to curve 43 and also matching the curves 37 and 39 in the lower wall of the recess and the upper wall of the phone unit or handset. The module 14 has an internal cavity 46 and a flat inner wall 47 having an opening 48 for rotatable engagement over pivot pin 40. The module is rotatably secured on pivot pin 40 by means of a suitable screw fastener 49 or the like, as best illustrated in FIG. 4. The inner wall of the recess and the pivot joint have aligned through bores 50, 51 respectively, providing communication between the cavity 46 in the antenna module and the cavity 18 in the handset.

The block 17 is secured in a recess 53 at the lower end of the module by screws or other fasteners, as best illustrated in FIG. 4. Alternatively, block 17 can be secured using an appropriate adhesive material. The counterweight is of suitable shape and dimensions for a flush fit in recess 53 with its outer surfaces flush with the adjacent surfaces of the module, as illustrated in FIGS. 1 and 2. Another option which may provide improved surface conformity or aesthetics, is to form a cavity in module 14 for receiving block 17. In this configuration, block 17 could be installed when circuit elements are mounted inside of module 14. The counterweight is of suitable shape and dimensions for a flush fit in recess 53 with its outer surfaces flush with the adjacent surfaces of the module, as illustrated in FIGS. 1 and 2.

The outer wall 54 of the module 14 and cavity 46 has a plurality of parallel, heat dissipating fins 58 in the region above counterweight 17, as best illustrated in FIG. 2. Fins 58 may be of a suitable metal having improved heat dissipating properties, such as aluminum or the like, or may be of the same plastic material as the remainder of the module apart from counterweight 17. The antenna 16 is secured to the upper wall of the module facing in the opposite direction to counterweight 17.

Preferably, some of the electronic components required for the portable phone are mounted in the cavity 46 in the antenna module, rather than in the handset cavity 18. In the illustrated embodiment, RF components 60, 61 and 62, such as a transmitter, receiver, duplexer, low noise amplifier and power amplifier, are mounted on a circuit board 64 within cavity 46. Other components for controlling and operating the portable phone unit are mounted in the handset cavity 18 on circuit board 65, in a conventional manner. The antenna is connected to the components in cavity 46 via cable 66, and the RF components in the cavity 46 are connected via coaxial cable 68 extending through bores 50 and 51 to the components in the handset cavity 18.

When the portable phone is to be used, the user first releases the antenna 16 from recess 32. At this point, the antenna module is free to rotate about pivot axis 30, and will tend to rotate into a position in which the counterweight 17 is lowermost and faces vertically downwards, regardless of the orientation of the handset itself. When the counterweight is oriented downwards under the action of gravity, the antenna will be oriented vertically upwards, as indicated in FIGS. 2 and 3 for two different orientations of the handset. Thus, after the user releases the antenna and moves the handset into an appropriate position with speaker 22 adjacent one ear, such as the position illustrated in FIG. 2, the weight of counterweight 17 will rotate module 14 in an anti-clockwise direction partially out of recess 26 until the counterweight faces directly downwards and the antenna is vertically oriented. The curved portion 37 of the lower wall of the recess permits rotation of the module into the orientation illustrated in FIG. 2. Since the pivot axis extends in a direction transverse to the plane of speaker 22, it will be oriented more or less horizontally regardless of the orientation of the handset, since the handset must be oriented with the speaker more or less vertical against the user's ear.

If the handset is angled in the opposite direction, for example to place it against the opposite ear of a user, as illustrated in FIG. 3, the module 14 will rotate in the opposite, clockwise direction out of recess 26 so that the counterweight is facing downwards and the antenna is directed vertically upwards. Thus, this arrangement allows for automatic vertical correction of the antenna pointing direction with movement of the handset. The antenna is constantly counterweighted to a vertical position while the phone is rotated through any angle with the pivot joint and axis maintained closely horizontal.

If the handset is oriented vertically, the module will rotate into an orientation in which it is completely within the recess 26 with the lower wall 44 of the module positioned adjacent to the lower wall 36 of the recess and the upper wall 42 of the module aligned with the upper wall 38 of the handset. The shape of the upper and lower walls of the module are such that, when the module is rotated from that position into the inoperative, stored position of FIG. 1, the upper wall 42 of the module will be positioned adjacent to the lower wall 36 of the recess. The shape of the upper wall 42 is such that it matches the shape of the lower wall 36 of the recess when rotated into the stored position of FIG. 1. Although the upper and lower walls of the module and the lower wall of the recess are each only partially curved in the illustrated embodiment, these walls may alternatively be continuously curved surfaces, or spaced apart flat surfaces.

In this arrangement, the counterweight constantly seeks gravity, ensuring proper orientation of the antenna and reducing the risk of signal loss as the result of a user improperly positioning the antenna, or repositioning the handset during use. The user does not have to worry about positioning the antenna, since it positions itself automatically in a vertically upright position when released from recess 32. An unsophisticated user may be unaware of the potential power loss involved in improper antenna positioning or repositioning during use. This arrangement is, therefore, suitable for all users, and does not require any input from the user as regards initial antenna orientation or maintenance of proper antenna orientation during use.

Another advantage of this arrangement is the positioning of RF components in the cavity in the antenna module. The positioning of these components in close proximity to the antenna allows more optimal antenna performance. Additionally, the antenna module can be designed with greater heat transfer characteristics than the phone module, allowing heat generated by the internal components to be dissipated more readily.

To further control the motion of the antenna module 14 during use and place limits on antenna 16 motion when the telephone handset 12 is moved very rapidly, a damped bearing assembly, or damping mechanism, is used for pivot member 40. The damping mechanism provides rotational resistance to dampen the action of the antenna module 14 and provide for a slower response time to outside forces. This prevents sudden brief variations in handset motion from disturbing the generally vertical orientation of the antenna, such as when the handset is briefly jarred. Typically, such motions only temporarily disturb the handset position, and not by that much, and the handset is rapidly returned to an original position. If the antenna is allowed to compensate too quickly, it will be out of position by the time the handset is returned to an appropriate usage position. In addition, small positional variations or outside vibrations, left undamped might create an oscillatory motion in the antenna, causing swaying, which is deleterious to phone operation.

An exemplary damped bearing assembly is illustrated in the detailed cross section FIG. 6 which is the same as the view of FIG. 4 with the exception of a bearing assembly 70 replacing pivot pin 40 and a few numbers being omitted for clarity in illustration. In FIG. 6, bearing assembly 70 is mounted on flat inner wall 35 using known techniques such as, but not limited to, press fitting, or a flange and screw assembly. Bearing assembly 70 has an inner cylindrical support wall or race 72 that extends outward from inner wall 35 and is shown with a flange 74 secured to it for mounting the antenna module 14 in place. This could be accomplished for example using small screws extending through the flange 74 into one of the parallel side walls 41. The screws and flange could be accessed when electronic devices are mounted inside of the antenna module 14. Alternatively, other flange and screw arrangements, a variety of adhesives, potting compounds, or retaining rings, clips, and detents can be used to secure the antenna module on race 72, as would be apparent to those skilled in the art. Inner race 72, along with an outer race 76, and a bearing unit 78 form a complete damped bearing assembly 70. An external damping member such as a fibrous pad (not shown) pressing against a portion of race 72 could also be used to damp rotary motion, as desired.

While the module disclosed above works well and accommodates a variety of antenna elements, it is also possible to use a less complex structure for some applications. This is especially true for applications involving dual frequency antennas manufactured as a 'stacked' antenna structure using two elements that are each optimized to operate at a different frequency. In some satellite communication systems separate frequencies are used for transmitting to and receiving from the telephone unit, so called forward and reverse communication links. The antenna elements used to efficiently couple signal energy into or out of a transceiver at different frequencies are significantly different in size. That is, the radiators for one antenna are significantly longer than for the other when both use a length of say one-half the wavelength of interest. This size difference also creates a relative weight or mass difference that can be used to advantage in maintaining vertical antenna positioning.

Figure 7:
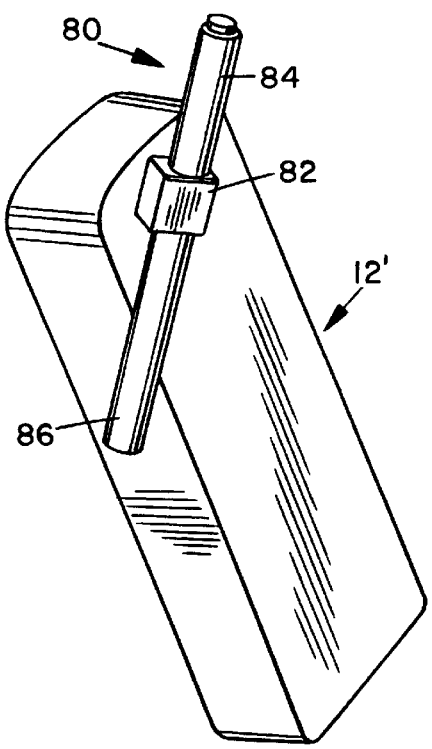
FIG. 7 is a perspective view of the rear of a telephone in a position of use, with the antenna in a self-sustaining vertical position according to an alternate embodiment of the invention.

A technique for using the weight difference, is shown in FIG. 7 where a rotatable antenna or antenna structure 80 is shown mounted on an antenna support module 82. The antenna support module 82 is in turn mounted directly on the housing of a handset 12', without the benefit of a recessed area 26. In this configuration, the antenna itself functions as a vertically correcting element and no additional structure, or weight, is generally used. However, some counterweight material can also be mounted within a lower portion of the antenna as a supplemental measure.

As shown in FIG. 7, antenna 80 is divided into an upper antenna element 84 and a lower antenna element 86, which are both shown being supported by the module 82. Each of the antenna elements 84 and 86 is a different length as determined by the size of the antenna radiator or radiators housed in that element, which is in turn based on the frequency it is configured to accommodate. An exemplary antenna structure for satellite communication systems could use a transmission antenna operating at around 1.618 GHz and a reception antenna operating at around 2.492 GHz. For such a system, using lengths on the order of one-half of the wavelength, would make upper antenna 84 element close to two-thirds of the length of lower antenna element 86. With all other construction materials being substantially the same, this length difference (radiators) creates a weight imbalance in favor of the lower antenna 86 when the antennas are pivoted about common respective ends. That is, around a point where the two antenna elements are joined together to form a single antenna structure 80.

The antenna support module 82 is mounted to rotate freely on the rear housing of a telephone handset 12', using a support bearing or pivot pin structure similar to that described above. This allows antenna element 86 to assume a lowermost vertical position of the two antennas and maintain a vertical orientation for antenna structure 80. This mounting structure can be made similar to the rotating bearing joint 70 as before, or potentially less robust since a lower amount of weight and torque are being applied. However, some degree of damping may still be desired to prevent the antenna from rotating too freely.

Figure 8:
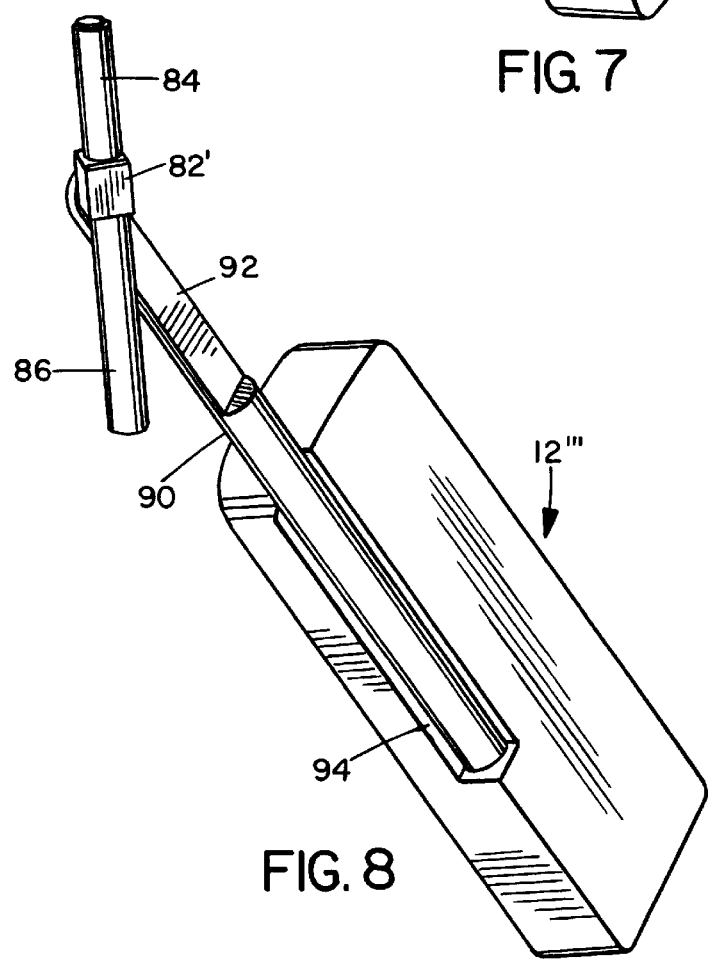
FIG. 8 is a perspective view of the rear of the telephone of FIG. 7 where the antenna is further mounted on a support mast extending from along one edge according to another embodiment of the invention.

An alternative embodiment for mounting antenna 80 is shown in FIG. 8, where the antenna support module 82 is secured to one end of an antenna support mast 90 in a narrower or recessed portion 92. This type of support structure might be used to elevate both antenna elements above or away from a handset to provide less obstructed signal transfer, or to be farther removed from handset users. The support mast 90 could be made as a telescoping element that retracts into the housing of a handset 12" along one edge within a recess 94. The recessed portion 92 of the mast 90 allows the antenna 80 to be rotated and positioned close to the handset housing within recess 94, when not in use. In the alternative, mast 90 can be mounted in more interior portion of a handset 12'" as shown in FIG. 9. In FIG. 9, the mast 90 is mounted to telescope or extend out of a passage 96, in a manner known in the art.

A structure useful for implementing the antenna module 82 is illustrated in further detail in FIG. 10. In FIG. 10, the antenna module 82 is shown having an outer wall 100 which encloses and supports the ends of the antenna elements 84 and 86. Outer wall 100 can be shaped to fit the particular handset configuration such as a cylindrical shape to conform to the exterior form of the antenna elements. Each antenna element 84, 86 can be mounted on, and extend through, wall 100 using a variety of known techniques including an adhesive or polymer compound, set screws, or threaded elements.

The antenna module 82 is mounted on an end portion of support mast 90 using a small bearing assembly similar to bearing assembly 70 which uses an inner race 102, flange 104, outer race 106, and bearing unit 108. The outer race 102 is shown as being press fit into a thicker wall portion 110 of support mast 90. However, those skilled in the art will readily understand that other techniques can be used to implement this rotary joint and mounting.

A cable or wire assembly 112 provides antenna feeds for antenna elements 84, 86 as performed by feed 68 above. Generally, wire assembly 112 is formed as a bundle of individual coaxial cables 114 and 116 which separate from each other at the end of cable assembly 112 and provide separate signal transfer paths for each antenna element. Those skilled in the art are familiar with signal cable feed structures and networks that would be used to transfer energy to or from the antennas during use, and additional details on such elements are not presented here.

When using coaxial cables, or other feed wires, it is desirable to also employ a stop mechanism to prevent rotation of the antenna or antenna module beyond certain limits. That is, full 360° rotations or excessive travel beyond a useful angle (say greater than 90° from vertical), can eventually cause cable damage or disconnection. Those skilled in the art are familiar with such mechanisms and they are not shown here in detail. For example, pin (not shown) could be mounted on the underside of the antenna module to interact with a stop block or groove on the handset, or the mast, to limit rotary motion.

These latter embodiments are less desirable for most applications and present a less favorable aesthetic appearance for most users. However, a decrease in complexity and a potentially lower cost may make this configuration attractive for some markets. In addition, this structure can be positioned on larger less portable phone structures or devices which are moved on occasion but are not constantly or consistently hand held during use. This type of vertical compensation can account for local surface variations such as uneven ground or mounting surfaces, and allow the telephone to be used effectively by unsophisticated users without requiring leveling or such. It also compensates for occasional movements of the phone or surroundings. That is, small variations from horizontal (or vertical) are automatically compensated for in an environment where antenna aesthetics are not as important as function.

Since the invention assures that the antenna or antennas have a reasonably vertical orientation, the radiation pattern used can be optimized to have a more vertical pattern. This results in more efficient signal energy transfer and improved communication system performance.

Although preferred embodiments of the invention have been described above by way of example only, it will be understood by those skilled in the field that modifications may be made to the disclosed embodiments without departing from the scope of the invention, which is defined by the appended claims.

What we claim is:

1. A portable telephone unit, comprising:

a telephone handset having a microphone and a speaker;

an antenna module capable of housing electronic components for transferring signals between an antenna and other signal processing components within said handset;

orienting means secured to a lower portion of said module for urging the module to rotate relative to the handset into a predetermined vertical orientation independent of the handset orientation under the influence of gravitational forces;

the antenna projecting in a pointing direction from the module, the antenna being oriented vertically when said module is in said predetermined orientation; and a pivot joint pivotally securing the antenna module to the handset for rotation relative to the handset about a pivot axis, with the antenna module being rotatable about said pivot axis from an inoperative, stored position in which the antenna is located alongside said handset into any orientation relative to said handset depending on the handset orientation;

releasable locking means for releasably securing said antenna and module in said stored position.

2. The unit as claimed in claim 1 wherein the handset has spaced side walls, an upper wall and a lower wall, and a recess of predetermined shape and dimensions with a two-sided cut out extending inwardly from the upper wall and rear wall of the handset, the recess having an inner, flat wall extending downwardly from said upper wall and a lower end wall extending outwardly from said inner wall to the rear wall, and the module is of shape and dimensions substantially matching those of the recess, the module being pivotally secured in said recess by the pivot joint extending between a set of opposing inner walls for said recess and module.

3. The unit as claimed in claim 1, wherein the handset has a recess for receiving said antenna in said stored position.

4. The unit as claimed in claim 1, wherein the handset and module each have an internal cavity and the pivot joint has a through bore connecting the internal cavities of the handset and antenna module together, a first set of electronic components being mounted in the handset cavity and a second set of electronic components being mounted in the antenna cavity, and a connecting cable extends through said bore between the two sets of components.

5. The unit as claimed in claim 4, wherein said second set of components includes radio frequency components located in proximity to said antenna.

6. The unit as claimed in claim 4, wherein said module has an inner wall facing said handset and an outer wall, and a plurality of heat dissipating fins extend across at least part of the area of said outer wall.

7. The unit as claimed in claim 1, wherein the module has an upper wall and a lower wall, the lower wall having a recess, a counterweight comprising a solid block of metal mounted in said lower wall recess, and the antenna extending from said upper wall.

8. The unit as claimed in claim 1, wherein said antenna module comprises a multiple frequency antenna having first and second cylindrical antenna elements forming a union at respective ends along a common central axis, said elements being configured to operate at two different frequencies with one having a mass greater than the other, and said antenna module is mounted by said pivot joint to rotate about said union so as to automatically place said module in a position such that the antenna element having greater mass is lowermost in said predetermined orientation.

9. The unit as claimed in claim 8, further comprising an antenna support mast mounted on said handset and wherein said pivot joint is formed on one end of said support mast.

10. The unit as claimed in claim 9, wherein said support mast is a telescoping mast.

11. The unit as claimed in claim 7, wherein said antenna module comprises damping means for restricting rapid rotation of said antenna.

12. The unit as claimed in claim 2, wherein the recess has at least one end wall which is at least partially curved, and the module has a first peripheral wall of shape matching that of said recess end wall.

13. The unit as claimed in claim 1, wherein said pivot joint comprises damping means for restricting rapid rotation of said antenna.

* * * * *